(12) United States Patent
Keller (10) Patent No.: US 10,557,515 B2
(45) Date of Patent: Feb. 11, 2020

(54) GAS PRESSURE SPRING

(71) Applicant: SUSPA GmbH, Altdorf (DE)

(72) Inventor: Siegfried Keller, Nürnberg (DE)

(73) Assignee: SUSPA GmbH, Altdorf (DE)

( * ) Notice: Subject to any disclaimer, the term of this patent is extended or adjusted under 35 U.S.C. 154(b) by 0 days.

(21) Appl. No.: 15/416,586

(22) Filed: Jan. 26, 2017

(65) Prior Publication Data

US 2017/0219044 A1 Aug. 3, 2017

(30) Foreign Application Priority Data

Jan. 29, 2016 (DE) .................. 10 2016 201 386

(51) Int. Cl.
*F16F 13/00* (2006.01)
*F16F 9/02* (2006.01)

(52) U.S. Cl.
CPC .......... *F16F 13/002* (2013.01); *F16F 9/0218* (2013.01); *F16F 9/0281* (2013.01)

(58) Field of Classification Search
CPC ...... F16F 13/002; F16F 9/0218; F16F 9/0281; F16F 9/49
USPC ..... 267/140.13, 140.11, 64.11, 64.14, 64.15, 267/70, 127; 188/322.19, 322.22, 300, 188/282.3, 282.4, 282.6, 282.9, 286, 287
See application file for complete search history.

(56) References Cited

U.S. PATENT DOCUMENTS

| 4,066,279 | A | * | 1/1978 | Kaptanis | E05F 3/02 188/288 |
| 4,078,638 | A | * | 3/1978 | Koyama | F16F 9/063 188/288 |
| 4,303,231 | A | * | 12/1981 | Reuschenbach | F16F 9/0245 188/300 |
| 4,595,182 | A | * | 6/1986 | Freitag | F16F 9/0227 267/120 |
| 4,796,871 | A | * | 1/1989 | Bauer | F16F 9/49 188/282.1 |
| 4,819,770 | A | | 4/1989 | Hahn | |
| 5,797,593 | A | | 8/1998 | Oyaizu | |
| 5,961,102 | A | * | 10/1999 | Oyaizu | F16F 9/0209 188/300 |
| 6,129,343 | A | | 10/2000 | Ecarnot | |
| 9,657,755 | B2 | * | 5/2017 | Wilmot | F15B 15/1438 |
| 2006/0290037 | A1 | | 12/2006 | Born et al. | |

FOREIGN PATENT DOCUMENTS

| CN | 201027887 Y | 2/2008 |
| CN | 201152334 Y | 11/2008 |
| CN | 103542033 A | 1/2014 |
| CN | 105378300 A | 3/2016 |
| DE | 2513302 A1 | 10/1976 |
| DE | 4000865 A1 | 7/1991 |

(Continued)

*Primary Examiner* — Pamela Rodriguez
(74) *Attorney, Agent, or Firm* — McGlew and Tuttle, P.C.

(57) ABSTRACT

A gas pressure spring comprising a housing having a gas-filled interior, a longitudinal axis, a closed housing end and an open housing end which is situated opposite the closed housing end. The gas pressure spring additionally includes a piston rod which is displaceable along the longitudinal axis and is guided out of the housing in a sealed manner through the open housing end, a piston unit which is fastened on the piston rod and a damping unit for damping the displacement of the piston unit.

23 Claims, 8 Drawing Sheets

(56) References Cited

FOREIGN PATENT DOCUMENTS

| | | |
|---|---|---|
| DE | 696 19 781 T2 | 9/2002 |
| DE | 697 17 602 T2 | 4/2003 |
| DE | 10 2005 002 007 A1 | 3/2006 |
| DE | 10 2005 044 578 B3 | 5/2007 |
| EP | 0852303 B1 | 7/1998 |
| EP | 1790873 A1 | 5/2007 |

* cited by examiner

GAS PRESSURE SPRING

CROSS-REFERENCES TO RELATED APPLICATIONS

This application claims the priority of German Patent Application, Serial No. 10 2016 201 386.6, filed Jan. 29, 2016, pursuant to 35 U.S.C. 119(a)-(d), the content of which is incorporated herein by reference in its entirety as if fully set forth herein.

FIELD OF THE INVENTION

The invention relates to a gas pressure spring.

BACKGROUND OF THE INVENTION

Gas pressure springs are used to apply force to pivotably mounted parts, in particular to pivoting flaps.

An object underlying the invention is to provide a gas pressure spring with improved function.

The object is achieved by a gas pressure spring comprising a housing having a gas-filled interior, a longitudinal axis, a closed housing end, and an open housing end which is situated opposite the closed housing end, a piston rod which is displaceable along the longitudinal axis and is guided out of the housing in a sealed manner through the open housing end, a piston unit which is fastened on the piston rod, and a damping unit for damping the displacement of the piston unit.

The core of the invention consists in that a gas pressure spring comprises a damping unit. The damping unit makes it possible to damp a displacement of a piston of the gas pressure spring. The damping can act in the direction of retraction and/or in the direction of extension of the piston. The gas pressure spring comprises a housing, the interior of which is filled with gas. The housing comprises a longitudinal axis, along which a closed housing end and an open housing end, which is located opposite the closed housing end, are provided. A piston rod, which is guided out of the housing in a sealed manner through the open housing end, is provided so as to be displaceable along the longitudinal axis. A piston, which in particular divides the interior into a first part interior and a second part interior, is fastened on the piston rod. The damping unit comprises, in particular, a damping channel The gas is able to flow in a damped manner through the damping channel as a result of the displacement of the piston. The displacement of the piston is braked by the damped gas flow. The gas pressure spring has a damping function. The gas pressure spring has an increased functionality. For example, it is possible, as a result, to replace a gas pressure spring and a damper, that is to say two components, by the gas pressure spring according to the invention with damping function, that is to say one component. The number of components is reduced as a result. The overall size is reduced. The gas pressure spring according to the invention is usable in many areas, in particular in engineering, for industrial applications, in the automotive industry, the furniture industry, in medicine and/or aviation. The gas pressure spring is useable in a particularly advantageous manner in the area of armrests, in particular a centre armrest in the vehicle, vehicle seats, centrifuges in industry, chests, bed bases, furniture flaps, machine covers, hand luggage racks and/or side bars, so-called side rails, in the area of medicine, in particular hospital beds.

A damping element, in which the damping unit comprises a damping element, wherein, in particular, a damping channel is arranged between the damping element and the housing with reference to the longitudinal axis, ensures an uncomplicated and indirect realization of the damping action. A damping channel, in particular with reference to the longitudinal axis, is arranged between the damping element and the housing. The damping element enables variety when designing and arranging the damping channel A through-opening of the damping element, in which the damping element comprises at least one through-opening which is closable, in particular, by means of the piston unit, ensures a switching function. As long as the through-opening is open, when the piston is displaced, gas is able to flow substantially undamped through the through-opening. With the through-opening open, the damping function is reduced and is, in particular, non-active. As a result of closing the through-opening, in particular by the piston abutting against the damping element and in particular closing the through-opening, gas is able to flow exclusively through the damping channel as a result of the piston displacement. The damping function is active. The switching of the damping function is dependent on the position of the damping element along the longitudinal axis. The damping element is arranged in the housing so as to be displaceable along the longitudinal axis.

As a result, it is possible to switch on the damping function of the gas pressure spring in a targeted manner, in particular not until after a certain displacement distance in the direction of retraction and/or extension.

A gas pressure spring, in which the damping unit provides damping of the displacement of the piston unit in dependence on the position of the piston unit, wherein in particular in a non-damped state, damping-free displacement of the piston unit is effected and in a damped state, damped displacement of the piston unit is effected, ensures the damping function in dependence on the piston position. Damping-free displacement of the piston is possible in a non-damped state. Damped piston displacement is effected in a damped state. In particular, the piston position in which there is a change between the damped and the non-damped state is adjustable in a variable manner.

An arrangement of the damping unit comprising a spring element for exerting a resetting force on the damping unit ensures the damping unit and the piston are automatically reset as a result of the spring force, in particular when no external force acts on the gas pressure spring. The spring element can be arranged, for example, facing the closed housing end. In addition to this or as an alternative to this, the spring element can also be arranged facing the open housing end.

An arrangement of the damping unit, in particular of the damping element, wherein the damping unit, in particular the damping element, is arranged along the longitudinal axis between the spring element and the piston unit, enables advantageous incorporation of the damping unit in an existing gas pressure spring.

A realization of the damping channel, in which the damping channel is oriented, with reference to the longitudinal axis, radially and/or tangentially at least in portions, in particular in a spiral manner, a meandering manner and/or a helicoid manner, enables targeted adaptation of the damping action. In particular, the damping action is produced directly from the length of the damping channel, that is to say the length of the path which the flow medium, that is the gas, traverses along the damping channel. The length of the damping channel can be lengthened, for example, as a result of the damping channel being realized, in particular with reference to the longitudinal axis, in a spiral manner, a meandering manner and/or a helicoid manner. With reference to the longitudinal axis, the damping channel is oriented radially, in particular at least in portions, and/or tangentially, at least in portions.

A realization of the damping channel, in which the damping channel comprises a cross-sectional damping area which is smaller than a piston flow surface, enables a reliable damping function. The cross-sectional damping area is smaller than the piston flow surface. In particular, the cross-sectional damping area is a maximum of 10% of the piston flow surface, in particular a maximum of 8% of the piston flow surface, in particular a maximum of 5% of the piston flow surface and in particular a maximum of 3% of the piston flow surface.

A cross-sectional damping area which is realized in a variable manner, in which the cross-sectional damping area is variable along the longitudinal axis, enables the targeted adjustment of a damping characteristic in dependence on the piston displacement. It is possible, in particular, to realize the cross-sectional damping area in such a manner that it reduces when the piston is displaced in the retraction direction. A reduction in the cross-sectional damping area is possible, for example, as a result of a groove depth, in particular in the housing of the gas pressure spring and/or on an outside surface of the damping element, reducing along the direction of retraction. The applies correspondingly to a groove width. As a result, the damping action is increased in the direction of retraction.

The design of the piston is simplified in the case of a realization of the damping channel, in which the damping channel is realized in the housing as an indentation. The piston can be realized as a ring-cylindrical sleeve. The damping channel is realized as an indentation in the housing. In particular, the damping channel can be incorporated in the housing as a longitudinal groove. In particular, several longitudinal grooves can be provided in the housing. The damping action can be adjusted in a targeted manner by means of the number, size, that is to say in particular the size of the cross-sectional damping area, and the length of the longitudinal grooves.

In the case of the realization of the damping channel, in which the damping channel is incorporated in the damping element, in particular on a cylinder outside wall, the design costs for the housing are simplified. The damping channel is incorporated in the damping element. In particular, the damping channel is realized incorporated on a cylinder outside wall of the damping element.

An arrangement of the damping unit, in which the damping unit, in particular the damping element, is arranged along the longitudinal axis between the closed housing end and the piston unit, enables the direct damping of a displacement of the piston rod in the direction of retraction.

An arrangement of the damping unit, in which the damping unit, in particular the damping element, is arranged along the longitudinal axis between the open housing end and the piston unit, enables direct damping of the displacement of the piston rod in the direction of extension.

A damping unit with two damping elements, in which the damping unit comprises two damping elements, wherein, in particular, the piston unit is arranged along the longitudinal axis between the damping elements, enables a damping action both in the direction of retraction and in the direction of extension. The gas pressure spring has increased functionality.

Further advantageous developments, additional features and details of the invention are produced from the following description of two exemplary embodiments by way of the drawing.

DESCRIPTION OF THE PREFERRED EMBODIMENTS

A gas pressure spring 1 shown in FIGS. 1 to 4 comprises a housing 2 having a longitudinal axis 3 and a piston rod 4 which is displaceable along the longitudinal axis 3 in relation to the housing 2. The housing 2 surrounds an interior 5 which is filled with gas. The housing 2 comprises a closed housing end 6 which is shown on the right-hand side in FIG. 1. The housing 2 is closed in a gas-tight manner at the closed housing end 6. An open housing end 7 is arranged opposite the closed housing end 6. The piston rod 4 is guided out of the housing 2 through the open housing end 7. A guide element 8 and a sealing element 9 are provided for this purpose. The piston rod 4 is guided out of the housing 2 in a sealed manner. The displacement of the piston rod 4 along the longitudinal axis 3 is effected in a guided manner.

Figure 1:
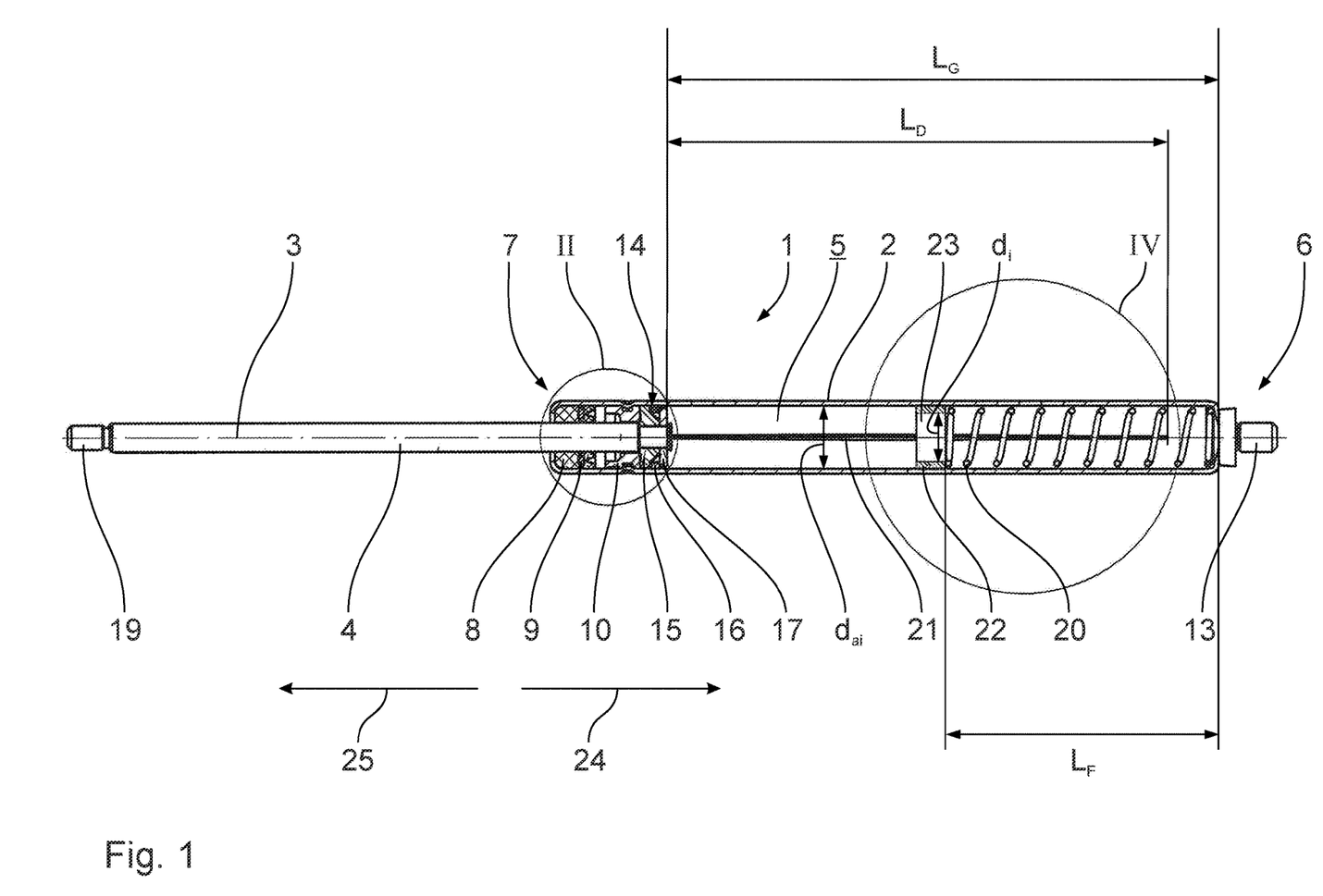
FIG. 1 shows a longitudinal section of a gas pressure spring according to the invention with the piston rod extended.

A housing fastening element 13 is provided on the end face in the region of the closed housing end 6. The housing fastening element 13 is realized as a threaded pin. The housing 2 can be fastened directly to a component to be connected thereto by way of the housing fastening element 13. It is also possible for a ball-shaped head receiving means to be fastened, for example, on the threaded pin of the housing fastening element 13.

An intermediate element 10, which is fixed axially on the housing 2, is additionally arranged in the region of the open housing end 7. The intermediate element 10 serves as a stop for a maximum extension movement of the piston rod 4. The axial fixing of the intermediate element 10 on the housing 2 is effected by means of exterior impressions 11 in the housing 2 which engage in recesses 12 of the intermediate element 10 which are provided for this purpose. The intermediate element 10 is held in a positive locking manner on the housing 2. Several substantially circular or line-groove-shaped impressions can be provided along the exterior periphery of the housing 2. It is also conceivable to realize the impression 11 along the entire exterior periphery, that is to say as a ring-shaped groove.

Figure 4:
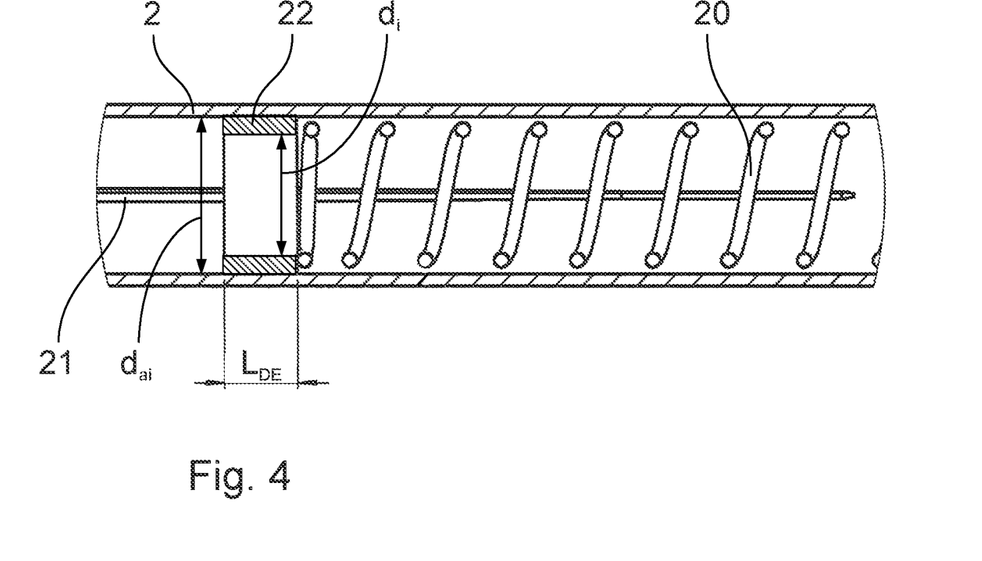
FIG. 4 shows an enlarged detailed representation of the detail IV in FIG. 1.

The piston rod 4 is arranged with a first end inside the housing 2. A piston unit 14 is fastened on the piston rod 4 at said piston-rod-side end. The piston unit 14 includes a piston element 15, a piston ring 16 which abuts in a sealing manner against the inside surface of the housing 2 and a retaining disc 17 to hold the piston ring 16 axially on the piston element 15. The retaining disc 17 is fixed axially on the piston rod by means of an integrally moulded attachment 18. The attachment 18 is in particular imprinted. The attachment 18 forms the end-face end of the piston rod 4. The piston element 15 is held axially on an abutment shoulder of the piston rod 4. The piston unit 14 is fastened on the piston rod 4. Displacement of the piston rod 4 along the longitudinal axis 3 directly brings about a displacement of the piston unit 14. A piston rod fastening element 19, which is realized as a threaded pin in a manner corresponding to the housing fastening element 13, is arranged on an exterior end of the piston rod 4 which is located opposite the interior end of the piston rod 4.

A spring element 20 is provided on an interior end face of the closed housing end 6. The spring element 20 is realized as a helical spring.

Figure 2:
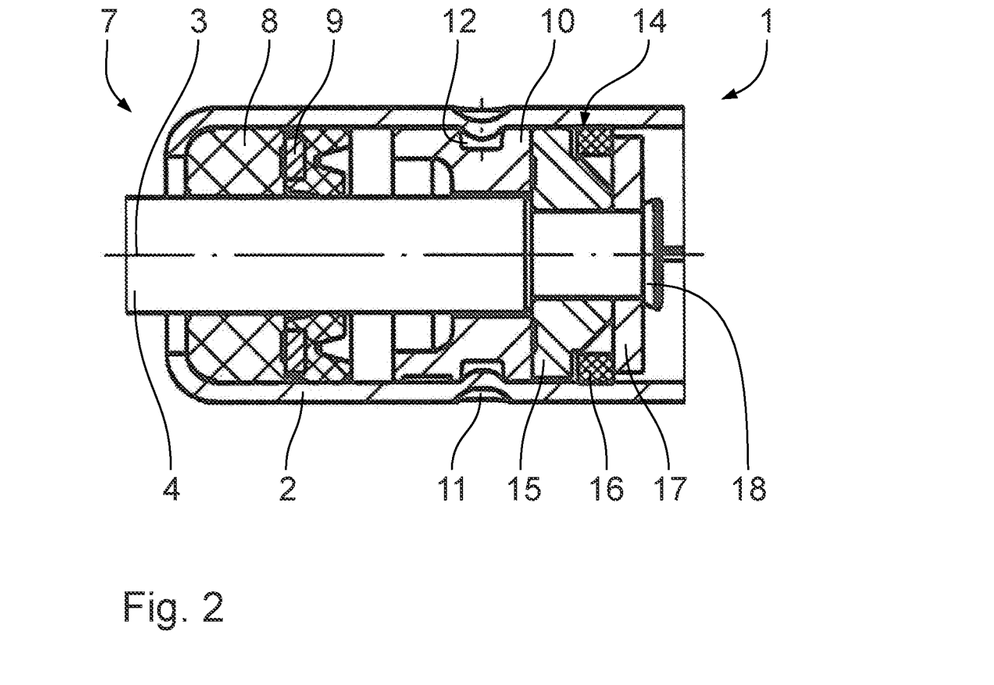
FIG. 2 shows an enlarged representation of the detail II in FIG. 1.
Figure 3:
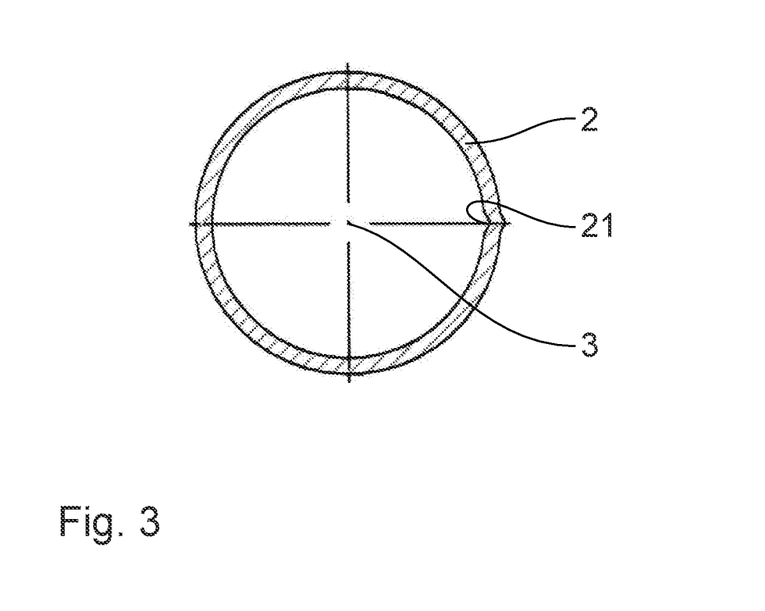
FIG. 3 shows a cross section through the housing of the gas pressure spring according to FIG. 1.

The gas pressure spring 1 comprises a damping unit with a damping channel 21. The damping channel 21 is realized as a longitudinal groove incorporated in the housing 2. According to the exemplary embodiment shown, precisely one longitudinal groove is provided. It is conceivable to provide several damping channels along the interior periphery of the housing 2. The damping channels can be arranged on the housing 2, for example, in each case parallel to the longitudinal axis 3 and in particular at identical spacings. According to the exemplary embodiment shown, the damping channel 21 has a damping channel length LD which corresponds to at least 80% of the housing length $L_G$. The following applies in particular: $L_D \geq 0.85 \times L_G$ and in particular $L_D \geq 0.9 \times L_G$. The damping unit additionally comprises a damping element 22. The damping element 22 is realized as a ring-cylindrical sleeve. The damping channel 21 is realized as a lumen which is delimited both in the radial and in the tangential direction with reference to the longitudinal axis 3 by the damping element 22 and the housing 2.

The damping element 22 comprises an outside diameter which corresponds substantially to the inside diameter of the cylindrical housing 2. The damping element 22 is displaceable in the housing 2 along the longitudinal axis 3. The damping element 22 comprises a through-opening 23. The through-opening 23 enables gas to flow through. The through-opening 23 can be closed as a result of abutting the piston unit 14 against the damping element 22. An inside diameter $d_i$ of the through-opening 23 is at least half of the inside diameter $d_{ai}$ of the housing 2. The following applies in particular: $d_i \geq 0.6 \times d_{ai}$, in particular $d_i \geq 0.65 \times d_{ai}$, in particular $d_i \geq 0.7 \times d_{ai}$, in particular $d_i \geq 0.75 \times d_{ai}$ and in particular $d_i \geq 0.8 \times d_{ai}$.

The damping element 22 comprises a damping element length $L_{DE}$ along the longitudinal axis 3. The damping element length $L_{DE}$ fixes the length of the respectively active damping channel The damping channel that is active for the damping action is fixed between an external cylinder surface of the eye-shaped damping element 22 and the groove-shaped indentation on the inside surface of the housing 2. The longer the damping element length $L_{DE}$, the longer the damping channel 21 and the greater the damping action of the gas pressure spring 1. Elongation of the damping channel 21 of the gas pressure spring 1 can also be achieved as a result of not realizing the damping channel in a linear manner and realizing it, in particular, in a spiral or meandering manner on the external cylinder surface of the damping element 22.

The following applies in particular $L_{DE} \leq 0.2 \times L_G$, in particular $L_{DE} \leq 0.15 \times L_G$, in particular $L_{DE} \leq 0.1 \times L_G$ and in particular $L_{DE} \leq 0.08 \times L_G$.

The spring element 20 is relaxed in an initial position of the gas pressure spring 1. In said relaxed arrangement, the spring element 20 comprises an initial length $L_F$. The initial length $L_F$ of the spring element 20 fixes the position of the damping element along the longitudinal axis 3. The damping element 22 abuts against the spring element 20. The spring element 20 serves for positioning the damping element 22. The positioning of the damping element 22 fixes from which point on the path of retraction the damping of the gas pressure spring 1 is activated.

The function of the gas pressure spring 1 is explained in more detail below by way of FIGS. 1 to 5. Proceeding from the arrangement according to FIG. 1 in which the piston rod 4 is pulled out of the housing 2 as far as possible, retraction of the piston rod 4 along the longitudinal axis 3, that is to say in the direction of retraction 24, causes the retraction force to increase in a linear manner The piston unit 14 is displaced axially along the longitudinal axis 3 by way of the piston rod 4. The piston unit 14 is displaceable in a sealed manner along the housing 2 on account of the sealing abutment of the piston element 15 against the inside surface of the housing 2. The gas arranged in the interior 5 is compressed by the displacement of the piston. The compressed gas is able to flow through the through-opening 23 of the damping element 22.

As soon as the piston unit 14 has been retracted to such an extent that it abuts against the damping element 22, further traversing of the through-opening 23 is prevented. In particular, the piston unit abuts in a sealing manner against the damping element 22. In particular, the piston unit 14 abuts in a sealing manner by way of the retaining disc 17 against the end face of the damping element 22. In said arrangement, which is the damped arrangement, gas is only able to flow exclusively through the damping channel 21. Compared to the through-opening 23, the damping channel 21 comprises a reduced cross-sectional damping area. In particular, the cross-sectional damping area of the damping channel 21 is a maximum of 10% of the cross-sectional area of the through-opening 23, in particular a maximum of 8%, in particular a maximum of 5% and in particular a maximum of 3%. The cross-sectional area of the through-opening 23 is defined as a piston flow surface.

Figure 5:
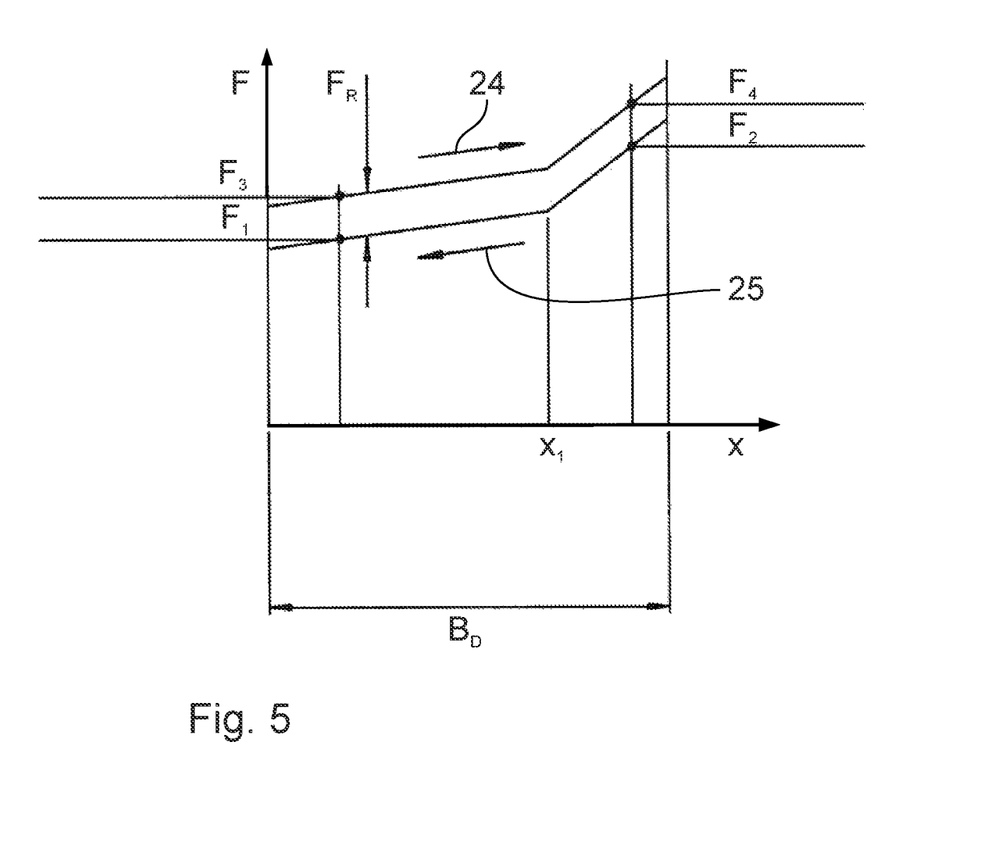
FIG. 5 shows a schematic representation of a force-path diagram for the gas pressure spring according to FIG. 1.
Figure 6:
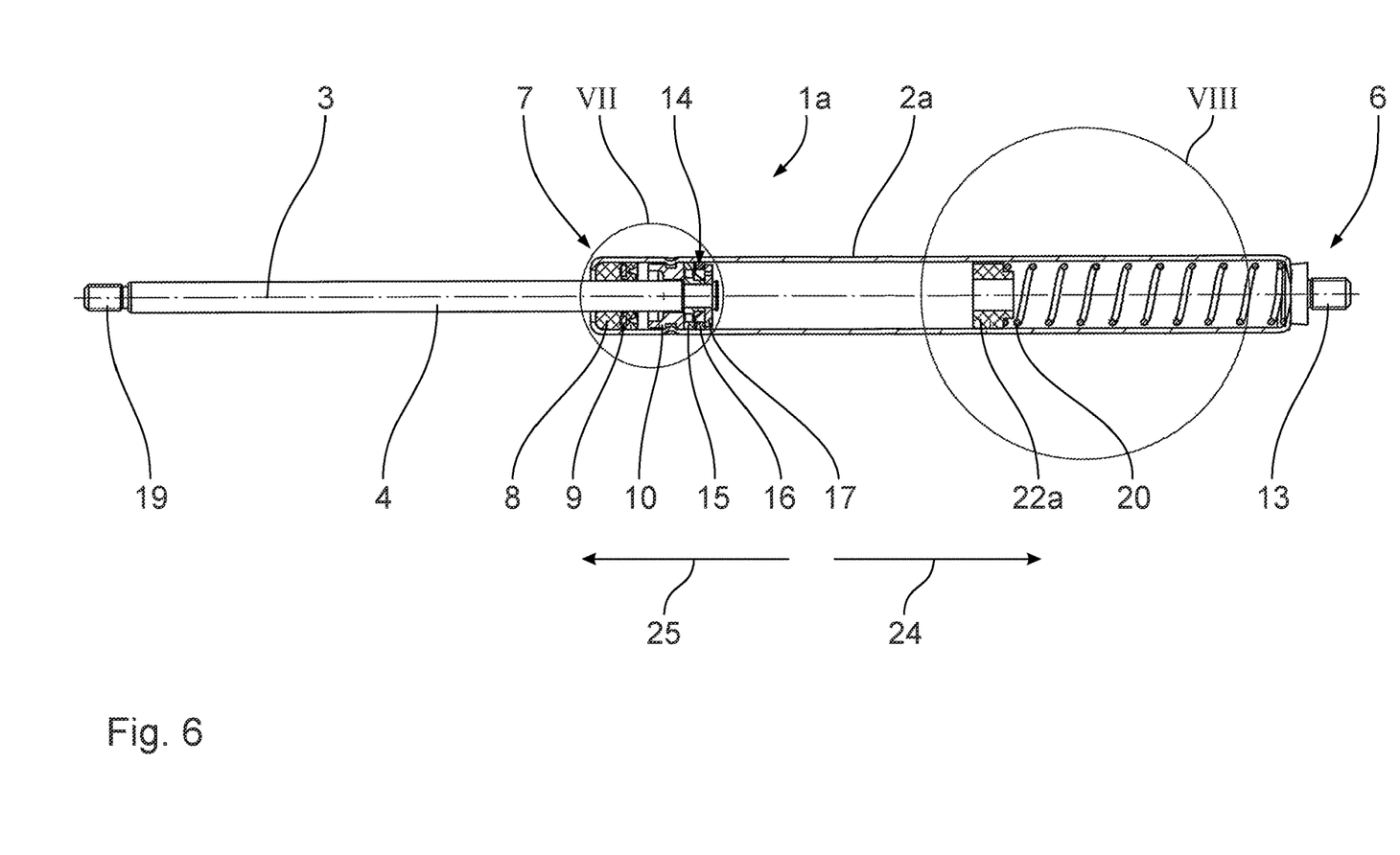
FIG. 6 shows a representation corresponding to FIG. 1 of a gas pressure spring according to a second exemplary embodiment.
Figure 7:
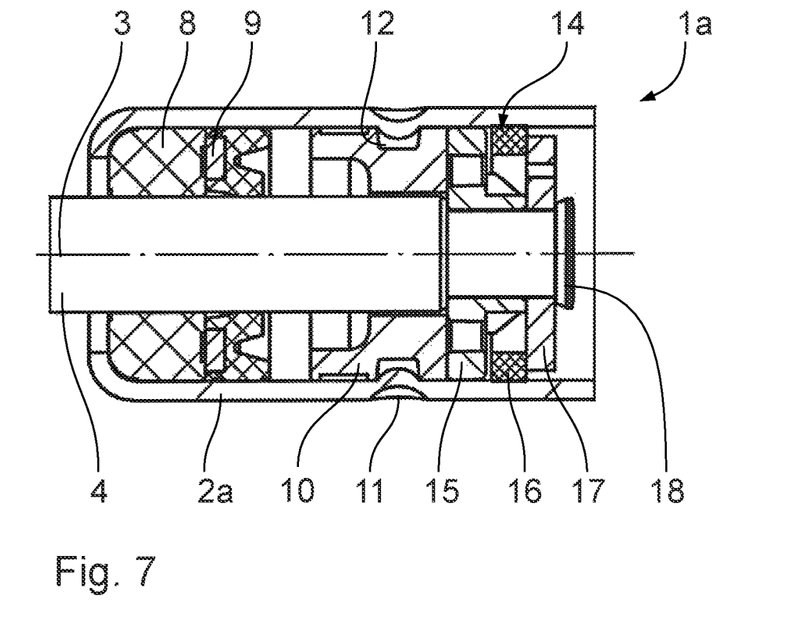
FIG. 7 shows an enlarged detailed representation of the detail VII in FIG. 6.
Figure 8:
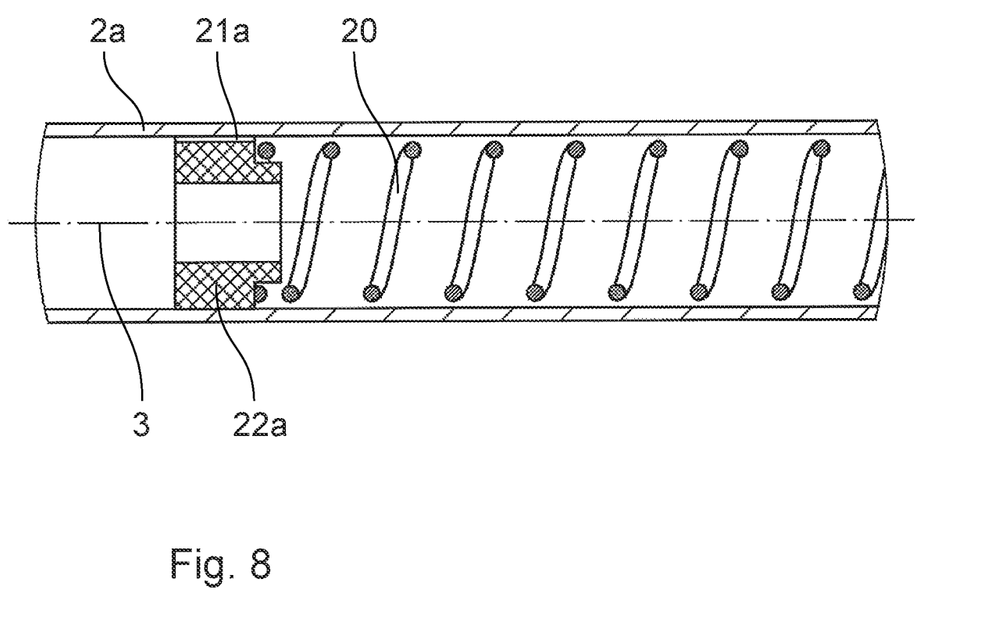
FIG. 8 shows an enlarged detailed representation of the detail VIII in FIG. 6.
Figure 9:
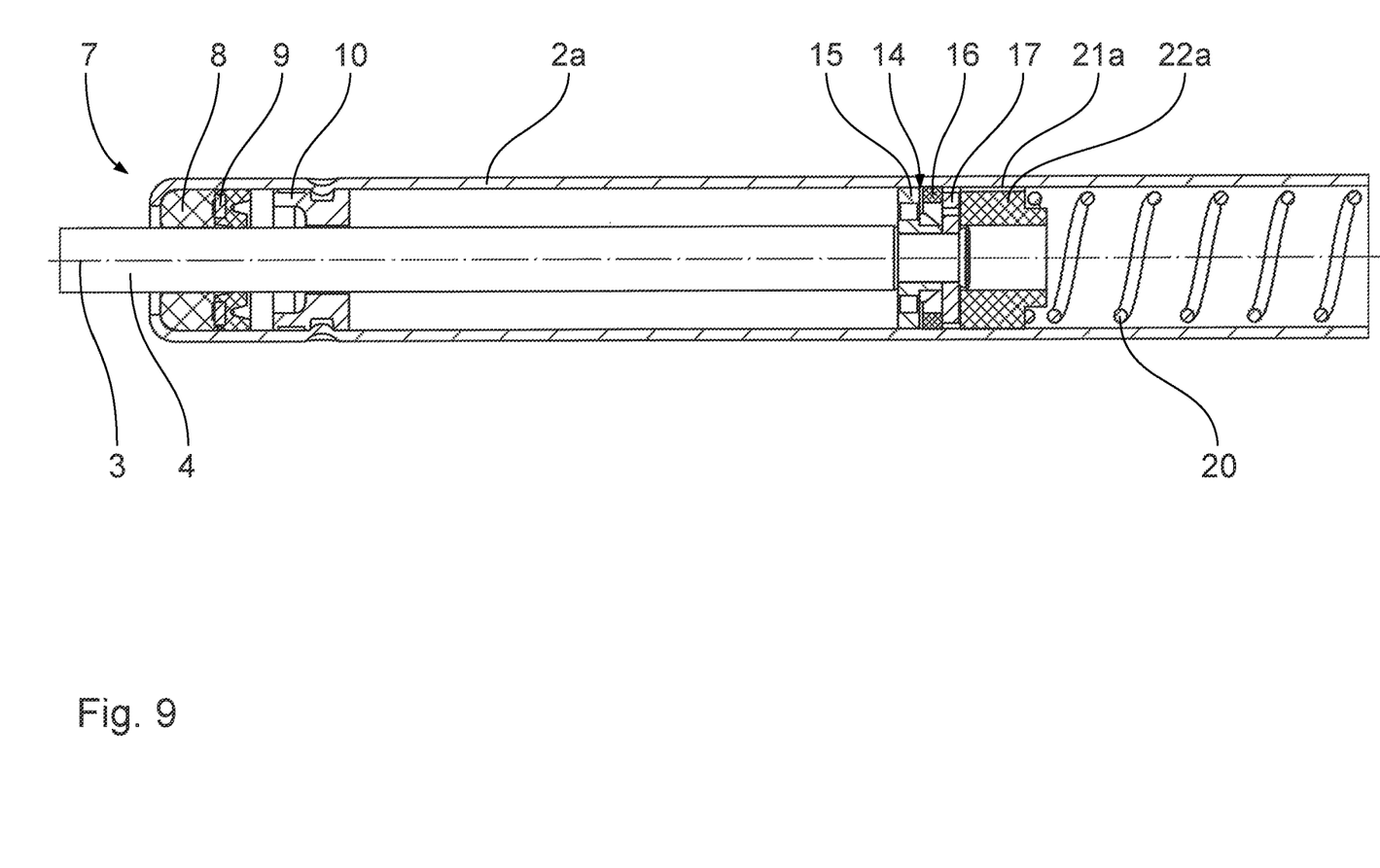
FIG. 9 shows an enlarged representation corresponding to FIG. 6 of the gas pressure spring with the damping unit in a damped state.
Figure 10:
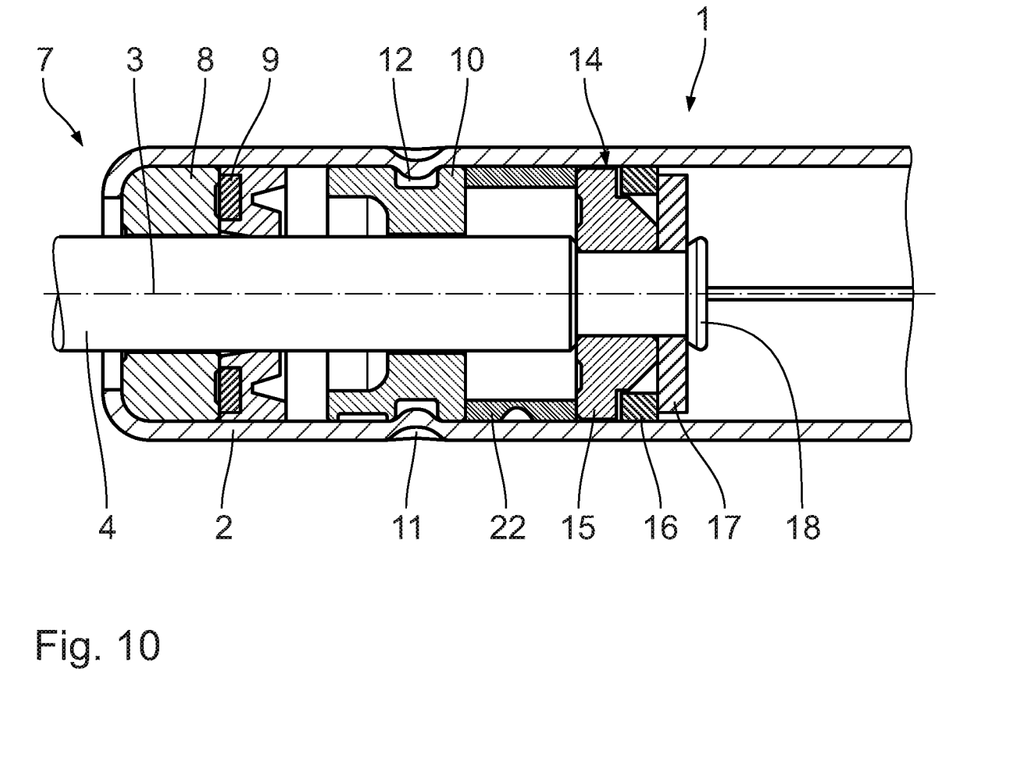
FIG. 10 is a view of a gas pressure spring with the damping unit, including the damping element being arranged between the open housing end and the piston unit.
Figure 11:
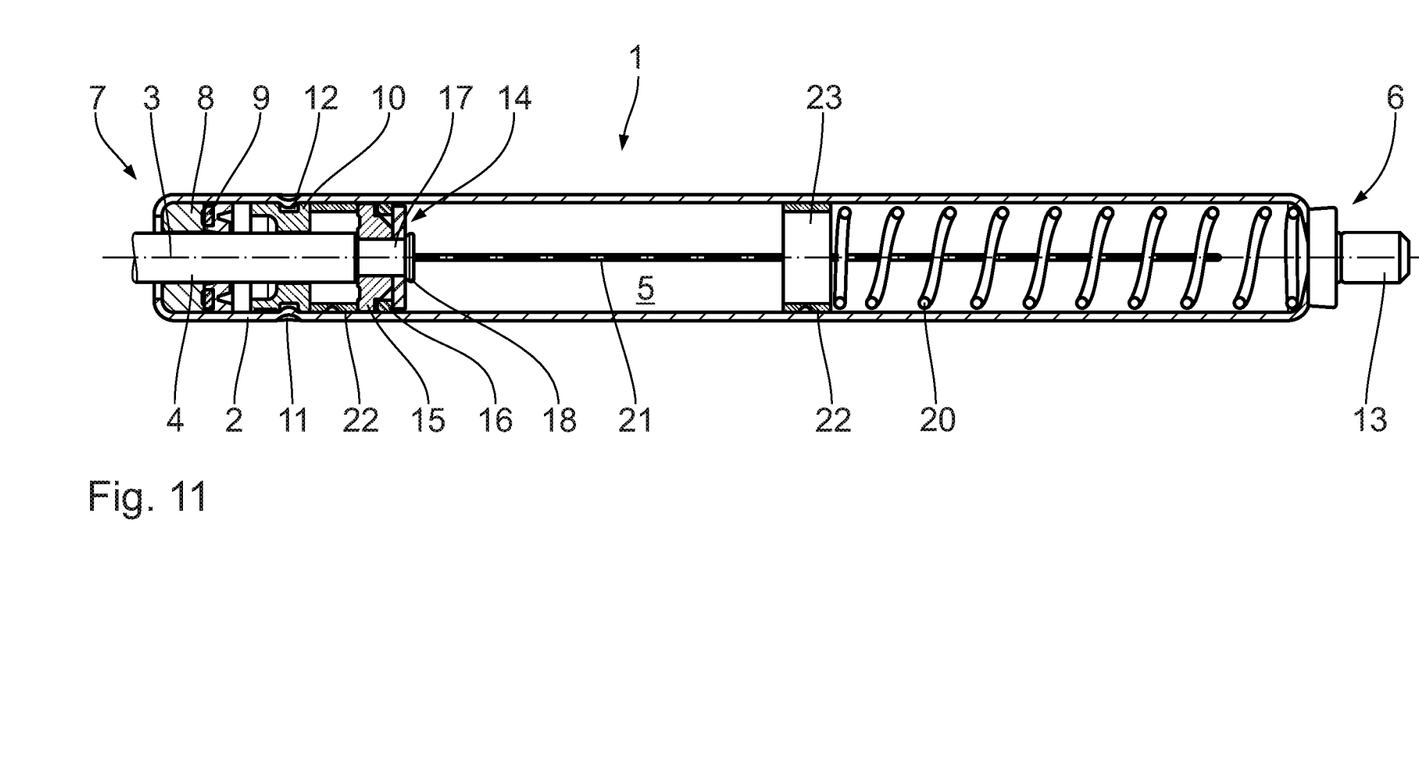
FIG. 11 is a view of a gas pressure spring with two damping elements and the piston unit is arranged between the damping elements.

The gas flow is damped. As a result, the displacement of the piston rod 4 with the piston unit 14 is additionally damped. This produces a further, in particular linear increase in force from the switching point $x_1$. $x_1$ characterizes the depth of retraction of the piston rod along the longitudinal axis 3 until the piston unit 14 abuts in a sealing manner against the damping element 22.

When the piston rod 4 is actuated in a direction of extension 25, which is opposite the direction of retraction 24, the damping element 22 is first of all pressed with its end face against the piston unit 14 as a result of the resetting force caused by the spring element 20. This means that, proceeding from a maximum retracted position of the piston rod 4, the through-opening 23 is first of all damped. As soon as, when the piston rod 3 is displaced further in the direction of extension 25, the spring element is fully relaxed, no further resetting force is exerted on the damping element 22. The damping element 22 remains in the initial position fixed by the spring element 20 according to FIG. 1. Said position corresponds to the path of retraction $x_1$. When the piston rod 4 is pulled out further in the direction of extension 25, the through-opening 23 is opened. The compressed gas is able to flow through the through-opening 23. The displacement of the piston rod 3 is effected without additional damping. Said context is shown schematically in the force-path diagram according to FIG. 5. Overall, the gas pressure spring 1 has a damping range $B_D$. The following applies in particular $B_D \geq 0.8 \times L_G$, in particular $B_D \geq 0.9 \times L_G$.

A second exemplary embodiment of the invention is described below with reference to FIGS. 6 to 9. Structurally identical parts receive the same reference symbols as in the case of the first exemplary embodiment, reference hereby being made to the description of said first embodiment. Structurally different, but functionally similar parts receive the same reference symbols followed by the letter a.

The essential difference in relation to the first exemplary embodiment consists in that the damping channel 21a is realized incorporated on the damping element 22a. The damping element 22a is realized in a non-round manner, in particular in the form of a flattening on the external cylinder surface of the damping element 22a. The damping channel 21a is produced as an edge gap between the damping element 22a and the cylindrical housing 2a. The damping channel 21a is arranged along the longitudinal axis 3 between the damping element 22a and the housing 2a. The housing 2a is realized in an uncomplicated manner.

It is particularly advantageous that a gas pressure spring known per se in the prior art is able to be fitted with a spring element 20 and a damping element 22 or 22a to form a gas pressure spring 1, 1a according to the invention with a damping function. It is possible to provide a gas pressure spring with a damping function in an uncomplicated manner.

What is claimed is:

1. A gas pressure spring comprising:
a housing comprising a gas-filled interior, a longitudinal axis, a closed housing end and an open housing end situated opposite the closed housing end;
a piston rod displaceable along the longitudinal axis and guided out of the housing in a sealed manner through the open housing end;
a piston unit fastened on the piston rod; and
a damping unit for damping the displacement of the piston unit, the damping unit comprising a damping element, the damping element being a ring-cylindrical sleeve, wherein a damping channel is arranged between the damping element and the housing with respect to the longitudinal axis, the ring-cylindrical sleeve comprising at least one through-opening, the at least one through-opening being concentrically arranged with respect to the longitudinal axis of the housing, the at least one through-opening being closable by the piston unit, wherein gas flow through said through-opening is enabled as long as the through-opening is open, the housing comprising a first chamber and a second chamber, the first chamber being in fluid communication with the second chamber via the at least one through-opening.

2. A gas pressure spring according to claim 1, wherein the damping unit provides damping of the displacement of the piston unit based on the position of the piston unit, wherein the damping unit is located at an axially spaced location from the piston when the piston is in an extended position.

3. A gas pressure spring according to claim 1, wherein the damping unit provides damping of the displacement of the piston unit based on the position of the piston unit, wherein in a non-damped state, damping-free displacement of the piston unit is effected and in a damped state, damped displacement of the piston unit is effected.

4. A gas pressure spring according to claim 1, further comprising a spring element for exerting a resetting force on the damping unit, the piston rod being located at an axially spaced location from the spring element.

5. A gas pressure spring according to claim 4, wherein the damping unit is arranged along the longitudinal axis between the spring element and the piston unit.

6. A gas pressure spring according to claim 4, wherein the damping element is arranged along the longitudinal axis between the spring element and the piston unit.

7. A gas pressure spring according to claim 1, wherein the damping channel is oriented, with respect to the longitudinal axis, at least one of radially and tangentially at least in portions.

8. A gas pressure spring according to claim 7, wherein the damping channel is oriented, with respect to the longitudinal axis, at least one of in a spiral manner, a meandering manner and a helicoid manner.

9. A gas pressure spring according to claim 1, wherein the damping channel is formed in the housing as an indentation.

10. A gas pressure spring according to claim 1, wherein the damping channel is incorporated in the damping element.

11. A gas pressure spring according to claim 1, wherein the damping channel is incorporated on a cylinder outside wall.

12. A gas pressure spring according to claim 1, wherein the damping unit is arranged along the longitudinal axis between the closed housing end and the piston unit.

13. A gas pressure spring according to claim 1, wherein the damping element, is arranged along the longitudinal axis between the closed housing end and the piston unit.

14. A gas pressure spring according to claim 1, wherein the damping unit is arranged along the longitudinal axis between the open housing end and the piston unit.

15. A gas pressure spring according to claim 1, wherein the damping element is arranged along the longitudinal axis between the open housing end and the piston unit.

16. A gas pressure spring according to claim 1, wherein the damping unit comprises two damping elements.

17. A gas pressure spring according to claim 1, wherein the damping unit comprises two damping elements, wherein the piston unit is arranged along the longitudinal axis between the damping elements.

18. A gas pressure spring according to claim 1, wherein the piston unit is movable between at least a first position and a second position, the piston unit engaging the damping element when the piston unit is in one of the first position and the second position, the piston unit being located at a spaced location from the damping element when the piston unit is in another one of the first position and the second position, wherein fluid flows exclusively through the damping channel when the piston unit is in the one of the first position and the second position.

19. A gas pressure spring according to claim 1, wherein the damping element comprises a first side and a second side, the first side being located axially opposite the second side with respect to the longitudinal axis, the first side comprising a first side opening, the second side comprising a second side opening, the through-opening comprising the first side opening and the second side opening.

20. A gas pressure spring, comprising:
a housing comprising a gas-filled interior, a longitudinal axis, a closed housing end and an open housing end situated opposite the closed housing end;
a piston rod displaceable along the longitudinal axis and guided out of the housing in a sealed manner through the open housing end;
a piston unit fastened on the piston rod;
a damping unit for damping the displacement of the piston unit, the damping unit comprising a damping element, the damping element being configured as a ring-cylindrical sleeve, wherein a damping channel is arranged between the damping element and the housing with respect to the longitudinal axis, wherein the damping channel comprises a cross-sectional damping area which is smaller than a piston flow surface, the piston flow surface being defined by a through-opening of the ring-cylindrical sleeve, wherein the through-opening enables gas to flow through the ring-cylindrical sleeve, the housing comprising a first chamber and a second chamber, the first chamber being in fluid communication with the second chamber via the through-opening.

21. A gas pressure spring according to claim 20, wherein the cross-sectional damping area is variable along the longitudinal axis.

22. A gas pressure spring according to claim 20, wherein the piston unit is movable between at least a first position and a second position, the piston unit engaging the damping element when the piston unit is in one of the first position and the second position, the piston unit being located at a spaced location from the damping element when the piston unit is in another one of the first position and the second position, wherein fluid flows exclusively through the damping channel when the piston unit is in the one of the first position and the second position.

23. A gas pressure spring comprising:
a housing comprising a gas-filled interior, a longitudinal axis, a first chamber, a second chamber, a closed housing end and an open housing end situated opposite the closed housing end;
a piston rod displaceable along the longitudinal axis and guided out of the housing in a sealed manner through the open housing end;
a piston unit fastened on the piston rod; and
a damping unit for damping the displacement of the piston unit, the damping unit comprising a damping element and a through-opening, the damping element comprising an outer contour in a plane oriented perpendicular to the longitudinal axis of the housing, the outer contour being non-round with respect to the longitudinal axis, wherein a damping channel is arranged as an edge gap between the damping element and the cylindrical housing, the first chamber being in fluid communication with the second chamber via the through-opening.

* * * * *